US008175298B2

(12) United States Patent
Mitani et al.

(10) Patent No.: US 8,175,298 B2
(45) Date of Patent: May 8, 2012

(54) AUDIO OUTPUT SYSTEM CONTROL METHOD AND AUDIO OUTPUT SYSTEM

(75) Inventors: Akihiro Mitani, Osaka (JP); Toshiki Murakami, Osaka (JP); Masahiko Mizoguchi, Osaka (JP); Akifumi Sakamoto, Osaka (JP); Koichi Otsuka, Osaka (JP); Teruyuki Tomonari, Kyoto (JP); Nobutaka Nakamae, Osaka (JP); Akihiro Fujita, Osaka (JP); Norimichi Kubo, Osaka (JP)

(73) Assignee: Panasonic Corporation, Osaka (JP)

( * ) Notice: Subject to any disclaimer, the term of this patent is extended or adjusted under 35 U.S.C. 154(b) by 1044 days.

(21) Appl. No.: 12/092,007

(22) PCT Filed: Oct. 31, 2006

(86) PCT No.: PCT/JP2006/321710
§ 371 (c)(1),
(2), (4) Date: Apr. 29, 2008

(87) PCT Pub. No.: WO2007/052636
PCT Pub. Date: May 10, 2007

(65) Prior Publication Data
US 2009/0269036 A1   Oct. 29, 2009

(30) Foreign Application Priority Data
Oct. 31, 2005   (JP) .................................. 2005-317248

(51) Int. Cl.
*H02B 1/00* (2006.01)
*H04R 29/00* (2006.01)
(52) U.S. Cl. .............. 381/123; 381/58; 381/74; 381/77; 348/734; 710/5; 375/211; 375/240.1

(58) Field of Classification Search .................... 381/58, 381/74, 123; 386/95, 96, 126; 375/211, 375/240.1; 710/5; 348/734
See application file for complete search history.

(56) References Cited

U.S. PATENT DOCUMENTS
6,034,737 A * 3/2000 Koyama et al. ............... 348/552
(Continued)

FOREIGN PATENT DOCUMENTS
EP   1 569 088   8/2005
(Continued)

OTHER PUBLICATIONS
International Search Report dated Dec. 12, 2006.
(Continued)

*Primary Examiner* — Kiesha Bryant
*Assistant Examiner* — Dmitriy Yemelyanov
(74) *Attorney, Agent, or Firm* — Dickinson Wright PLLC (57) ABSTRACT

In an audio output system including a TV, an AV amplifier, a DVD player, and the like, a simple control program decides an audio output mode setting, i.e., whether to output audio from a built-in speaker of the TV or output audio from an external speaker connected to the AV amplifier by linking operations of the respective devices. A control unit of a DVD player transmits a request signal concerning the audio output mode to a control unit of a TV. According to a request from the DVD player, the control unit of the TV instructs a control unit of an AV amplifier to be set to a mode for outputting audio from an external speaker connected to the AV amplifier or a mode for not outputting audio and sets a built-in speaker of the TV to a state opposite to the state of the external speaker.

16 Claims, 6 Drawing Sheets

U.S. PATENT DOCUMENTS

| | | | |
|---|---|---|---|
| 7,135,985 B2 * | 11/2006 | Woolgar et al. | 340/4.3 |
| 2003/0185400 A1 | 10/2003 | Yoshizawa | |
| 2004/0125953 A1 | 7/2004 | Cho | |
| 2004/0181301 A1 | 9/2004 | Kimura | |
| 2004/0239816 A1 * | 12/2004 | Ando | 348/705 |
| 2005/0165967 A1 | 7/2005 | Woolgar | |
| 2005/0168658 A1 * | 8/2005 | Woolgar et al. | 348/734 |
| 2006/0012710 A1 * | 1/2006 | Sasaki | 348/515 |
| 2006/0089735 A1 * | 4/2006 | Atkinson | 700/94 |
| 2006/0095596 A1 * | 5/2006 | Yung et al. | 710/5 |
| 2006/0104617 A1 * | 5/2006 | Mukaide et al. | 386/97 |
| 2007/0142022 A1 * | 6/2007 | Madonna et al. | 455/352 |

FOREIGN PATENT DOCUMENTS

| | | |
|---|---|---|
| JP | 05-153520 | 6/1993 |
| JP | 6/334928 | 12/1994 |
| JP | 10-79896 | 3/1998 |
| JP | 10-240666 | 9/1998 |
| JP | 11/275684 | 10/1999 |
| JP | 2003-298975 | 10/2003 |
| JP | 2004-7389 | 1/2004 |
| JP | 2004-95159 | 3/2004 |
| JP | 2004-282138 | 10/2004 |
| JP | 2005-051547 | 2/2005 |
| JP | 2005-51547 | 2/2005 |
| JP | 2005-524926 | 8/2005 |

OTHER PUBLICATIONS

Japanese Office Action dated Apr. 14, 2011.

Supplementary European Search Report dated Jun. 9, 2010.

"High-Definition Multimedia Interface Specification Version 1.2; Supplement 1 Consumer Electronics Control (CEC)," XP003003035, HDMI Licensing, LLC, Aug. 2005, p. CEC-i-CEC-vi, p. CEC-1-CEC-84.

S. Edison, "30.2: HDMI: High-Definition Multimedia Interface," XP007008293, SID International Symposium, vol. XXXIV, May 2003, p. 1024-1027.

* cited by examiner

FIG. 7

AUDIO OUTPUT SYSTEM CONTROL METHOD AND AUDIO OUTPUT SYSTEM

TECHNICAL FIELD

The present invention relates to an audio output system provided with an audiovisual device that reproduces video and audio, an external audio device that outputs audio signals from an external device to a connected external speaker, and an audio reproduction device that reproduces audio, and relates to method of controlling the audio output system.

BACKGROUND ART

Audio output systems in which an audiovisual device such as a television receiver (below, abbreviated as "TV"), an external audio device such as an AV amplifier to which an external speaker is connected, and an audio reproduction device such as a DVD player or recorder, have been connected are becoming widespread. In such an audio output system, when audio is output from the TV, and when audio is output from the external speaker connected to the AV amplifier, the user is required to switch the volume and input/output path of each device, so operation is troublesome.

In order to reduce the trouble of operation, technology has been proposed in which the devices are connected with a communications line, and an ID number is given to the individual devices, so that the devices can be aware of each other (Patent Document 1). With this technology, by sending commands from the respective devices to another device, the other, connected device is controlled.

Patent Document 1: Japanese Patent No. 3382118

DISCLOSURE OF THE INVENTION

Problem to be Solved by the Invention

However, in the above technology, only devices determined in advance can be connected to each other. Also, a complicated control program is necessary that takes into consideration, with respect to the individual devices, combinations with all of the other devices. Furthermore, it is necessary to fix the operations of the devices that can be connected, so this technology is not versatile.

For example, in an audio output system in which a TV, an AV amplifier, and a DVD player are connected, the user often views a movie or the like that has been recorded to a DVD. Accordingly, it is desirable that this audio output system is prepared such that when a power supply has been turned on, a speaker of the TV is muted, and it is possible to output sound from a speaker connected to the AV amplifier.

In an audio output system in which a TV, an AV amplifier, and a recorder are connected, the user often views a recorded TV broadcast. Accordingly, it is desirable that this audio output system is prepared such that when a power supply has been turned on, audio can be output from a speaker of the TV, and audio is not output from a speaker connected to the AV amplifier.

In both of the above two example audio output systems, an AV amplifier is connected to a TV, but in actuality an AV amplifier is not always connected. That is, it is desirable that an audio output system in which a TV and a DVD player are connected, or an audio output system in which a TV and a recorder are connected, is prepared such that when a power supply has been turned on, audio is output from a speaker of the TV.

In order to realize an audio output system that satisfies the above wishes, a control program is necessary that takes into consideration the type and combination of connected devices. If such a control program is not incorporated in advance in the audio output system, the above wishes cannot be satisfied. However, the specifications of the elements that configure the audio output system, namely the TV, the AV amplifier, the recorder, and the like, may be altered due to model changes or the like. Also, even if the type of device is the same, there may be a plurality of models having different specifications.

Creation of a control program that can address these sorts of problems, and testing of connections between the constituent elements of the audio output system, requires much labor and cost.

The invention was made in view of the above conventional problems, and it is an object thereof to provide an audio output system control method in which it is not necessary to incorporate a control program that takes into consideration the type and combination of connected devices, and that, even when the combination of devices has changed, is easily compatible with such changes, and to provide an audio output system in which that method is adopted.

Means for Solving the Problem

In order to achieve the above object, the audio output system control method according to the invention is a method for controlling an audio output system provided with an audiovisual device that outputs video and audio, an external audio device that outputs audio from an external speaker, and an audio reproduction device that reproduces audio signals, the method including the steps of:

(a) the audio reproduction device sending a request signal related to an audio output mode to the audiovisual device, and (b) the audiovisual device sending to the external audio device, according to the received request signal, a first instruction signal that instructs to establish a state in which audio is output from an external speaker connected to the external audio device, or to establish a state in which audio is not output, and the audiovisual device also setting a state of a built-in speaker of the audiovisual device to be opposite to the state of the external speaker.

It is preferable that the audio reproduction device, subsequent to processing to turn on a power supply, sends the request signal to the audiovisual device. Also, it is preferable that when the audio reproduction device is provided with a function to reproduce audio signals from recording media, the request signal is a signal that requests audio to be output from the external speaker connected to the external audio device. Also, it is preferable that when the audio reproduction device is provided with a function to reproduce audio signals from recording media, and record audio signals to the recording media, the request signal is a signal that requests audio to be output from the built-in speaker of the audiovisual device.

Also, it is preferable that the audiovisual device sends the first instruction signal to the external audio device, and if a response signal to the first instruction signal is not returned from the external audio device, the audiovisual device outputs audio from the built-in speaker of the audiovisual device.

Note that a configuration may be adopted in which the audio reproduction device, before sending the request signal to the audiovisual device, sends a second instruction signal to the audiovisual device that turns on the power supply of the audiovisual device. Also, a configuration may be adopted in which the audiovisual device, before sending the first instruction signal to the external audio device, sends a third instruction signal to the external audio device that turns on the power supply of the external audio device.

Also, in order to achieve the above object, the audio output system according to the invention is an audio output system provided with an audiovisual device that outputs video and audio, an external audio device that outputs audio from an external speaker, an audio reproduction device that reproduces audio signals, and a communications line that connects each of the devices, (a) the audio visual device provided with:

a built-in speaker that outputs audio, a first reception unit that receives audio signals from outside via the communications line, a first audio processing unit that performs necessary processing on audio signals received by the first reception unit, a first speaker drive unit that drives the built-in speaker using output of the first audio processing unit as input, and a first control unit that controls at least the first reception unit and the first speaker drive unit, (b) the external audio device provided with:

a second reception unit that receives audio signals from outside via the communications line, a second audio processing unit that performs necessary processing on audio signals received by the second reception unit, a second speaker drive unit that drives the external speaker using output of the second audio processing unit as input, a second transmission unit that transmits audio signals received by the second reception unit to outside via the communications line, and a second control unit that controls at least the second reception unit, the second transmission unit, and the second speaker drive unit, and (c) the audio reproduction device provided with:

a third audio processing unit that performs necessary processing on audio signals that have been reproduced, a transmission unit that transmits audio signals that have been output from the third audio processing unit to outside via the communications line, and a third control unit that controls at least the third audio processing unit and the transmission unit, (d) in which the third control unit sends a request signal related to an audio output mode to the first control unit, and the first control unit sends to the second control unit, according to the received request signal, an instruction signal that instructs to establish a state in which audio is output from the external speaker, or to establish a state in which audio is not output, and the first control unit also performs control so as to set the state of the built-in speaker of the audiovisual device to be opposite to the state of the external speaker.

In the audio output system according to the invention, it is preferable that a cable compliant with High Definition Multimedia Interface (HDMI) specifications is used as the communications line, and the request signal and the instruction signal are signals compliant with Consumer Electronics Control (CEC) specifications.

Also, in order to achieve the above object, the audiovisual device according to the invention is an audiovisual device that outputs video and audio, and along with an external audio device that outputs audio from an external speaker and an audio reproduction device that reproduces audio signals, configures an audio output system, (a) the audiovisual device provided with: a built-in speaker that outputs audio, a reception unit that receives audio signals from outside via a communications line, an audio processing unit that performs necessary processing on audio signals received by the reception unit, a speaker drive unit that drives the built-in speaker using output of the audio processing unit as input, and a control unit that controls at least the reception unit and the speaker drive unit, (b) in which the control unit receives a request signal related to an audio output mode that has been sent from a control unit of the audio reproduction device, and according to the received reception signal, to a control unit of the external audio device, sends an instruction signal that instructs to establish a state in which audio is output from the external speaker, or to establish a state in which audio is not output, and the control unit also controls the speaker drive unit so as to set the state of the built-in speaker to be opposite to the state of the external speaker.

Also, in order to achieve the above object, the external audio device according to the invention is an external audio device that outputs audio from an external speaker, and along with an audiovisual device that outputs video and audio, and an audio reproduction device that reproduces audio signals, configures an audio output system, (a) the external audio device provided with:

a reception unit that receives audio signals from outside via a communications line, an audio processing unit that performs necessary processing on audio signals received by the reception unit, a speaker drive unit that drives the external speaker using output of the audio processing unit as input, a transmission unit that transmits audio signals received by the reception unit to outside via the communications line, and a control unit that controls at least the reception unit, the transmission unit, and the speaker drive unit, (b) in which the control unit receives an instruction signal, sent from a control unit of the audiovisual device, that instructs to establish a state in which audio is output from the external speaker, or to establish a state in which audio is not output, and according to this instruction signal, the control unit controls the speaker drive unit (201).

Also, in order to achieve the above object, the audio reproduction device of the invention is an audio reproduction device that reproduces audio signals, and along with an audiovisual device that outputs video and audio, and an external audio device that outputs audio from an external speaker, configures an audio output system, (a) the audio reproduction device provided with:

an audio processing unit that performs necessary processing on reproduced audio signals, a transmission unit that transmits audio signals output from the audio processing unit to outside via a communications line, and a control unit that controls at least the audio processing unit and the transmission unit, (b) in which the control unit sends a request signal related to an audio output mode to a control unit of the audiovisual device.

Effect of the Invention

In the invention, the roles of the audiovisual device, the audio reproduction device, and the external audio device when setting the audio output mode are determined in advance. The audio output mode, i.e., whether audio is output from an audiovisual device such as a TV, or from an external audio device such as an AV amplifier, is determined according to a request from an audio reproduction device such as a DVD player or a recorder. The audiovisual device instructs the external audio device based on this request.

In this manner, in the invention, the audio output mode can be set with a simplified unidirectional control sequence, in which a request is made from the audio reproduction device to the audiovisual device, and an instruction is sent from the audiovisual device to the external audio device based on this request. Accordingly, with the invention, it is not necessary for the respective devices connected to the system to be aware of their combination with each other. Also, it is possible to realize a program that controls the individual devices that is simpler than with a conventional method.

BEST MODE FOR CARRYING OUT THE INVENTION

First Embodiment

An audio output system Ap1 according to a first embodiment of the invention will be described with reference to FIG. 1. The audio output system Ap1 of this embodiment is configured with a TV 100, an AV amplifier 200, an external speaker 300, and a DVD player 400. The TV 100 is an example of the audiovisual device in the invention, the AV amplifier 200 is an example of the external audio device, and the DVD player 400 is an example of the audio reproduction device.

Before describing the embodiment, the roles of each device included in the audio output system Ap1 according to the invention will be described. The roles, with respect to setting of the audio output mode, of the TV 100, the AV amplifier 200, and the DVD player 400 that configure the audio output system Ap1 are determined in advance.

That is, the DVD player 400 only sends a request signal with respect to the audio output mode to the TV 100, and does not send a request signal or instruction signal to the AV amplifier 200. Also, the TV 100 receives the request signal of the DVD player 400, and only sends an instruction signal with respect to audio output from the external speaker 300 to the AV amplifier 200, and does not send a request signal or instruction signal to the DVD player 400. The AV amplifier 200 only receives the instruction signal with respect to audio output from the external speaker 300 that has been sent from the TV 100, and does not send a request signal or instruction signal to another device.

As a result, setting of the audio output mode can be realized with a simplified unidirectional control sequence, in which a request is made from the DVD player 400 to the TV 100, and an instruction is sent from the TV 100 to the AV amplifier 200 based on this request.

Figure 1:
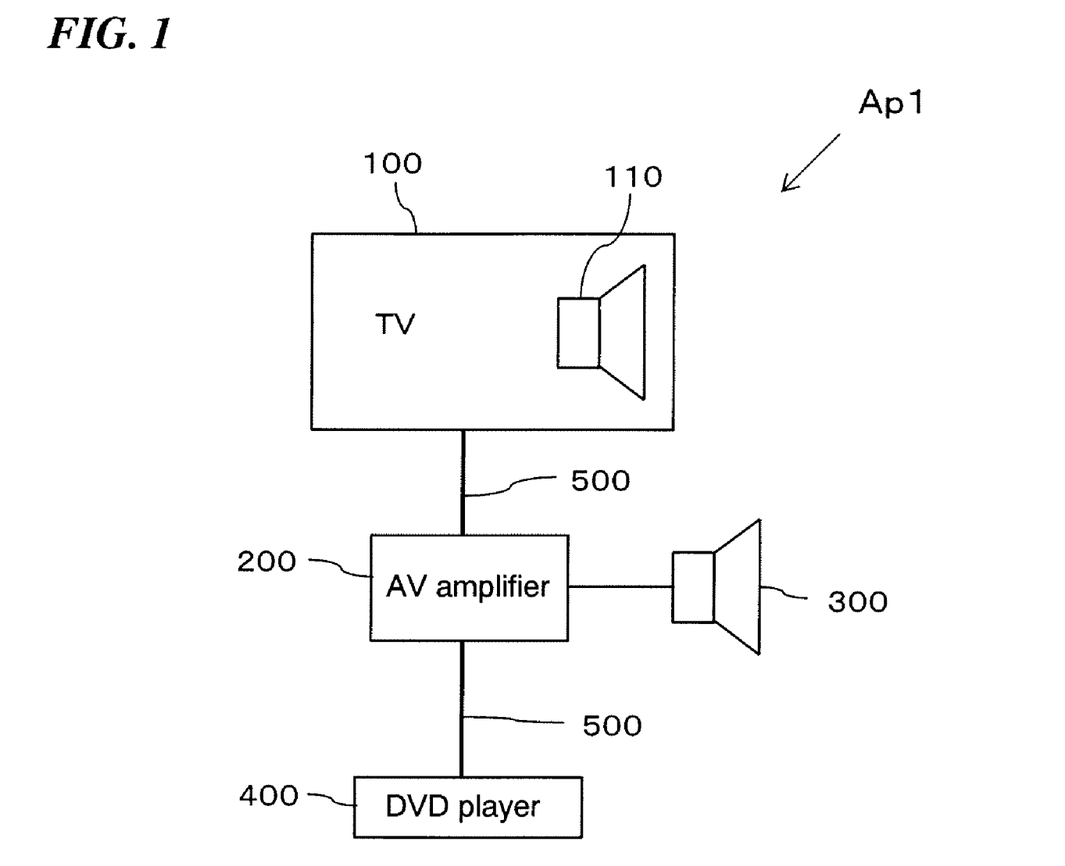
FIG. 1 is a block diagram that shows the configuration of an audio output system according to a first embodiment of the invention.

Next is a description of the configuration of the audio output system Ap1 according to this embodiment, with reference to FIG. 1. The TV 100 and the AV amplifier 200 are connected with a cable (referred to below as an HDMI cable) 500 compliant with High Definition Multimedia Interface (HDMI) specifications. Video signals and audio signals reproduced by the DVD player 400 are input to the AV amplifier 200.

The TV 100 and the AV amplifier 200 are also connected with an HDMI cable. Video signals and audio signals output from the AV amplifier 200 are input to the TV 100. The TV 100, the AV amplifier 200, and the DVD player 400 can send to and receive from each other commands that are compliant with Consumer Electronics Control (CEC) specifications, which are HDMI optional specifications, via an HDMI cable.

Also, in the following description, a "television mode" is defined as a state in which audio is output from a built-in speaker 110 of the TV 100, and audio output from the external speaker 300 connected to the AV amplifier 200 is muted. On the other hand, a "theater mode" is defined as a state in which audio is output from the external speaker 300 connected to the AV amplifier 200, and audio output from the built-in speaker 110 of the TV 100 is muted. Muting means a state in which audio is not output from a speaker. Specifically, this means a muted state established by preventing audio output from a speaker, or reducing the volume.

Figure 2:
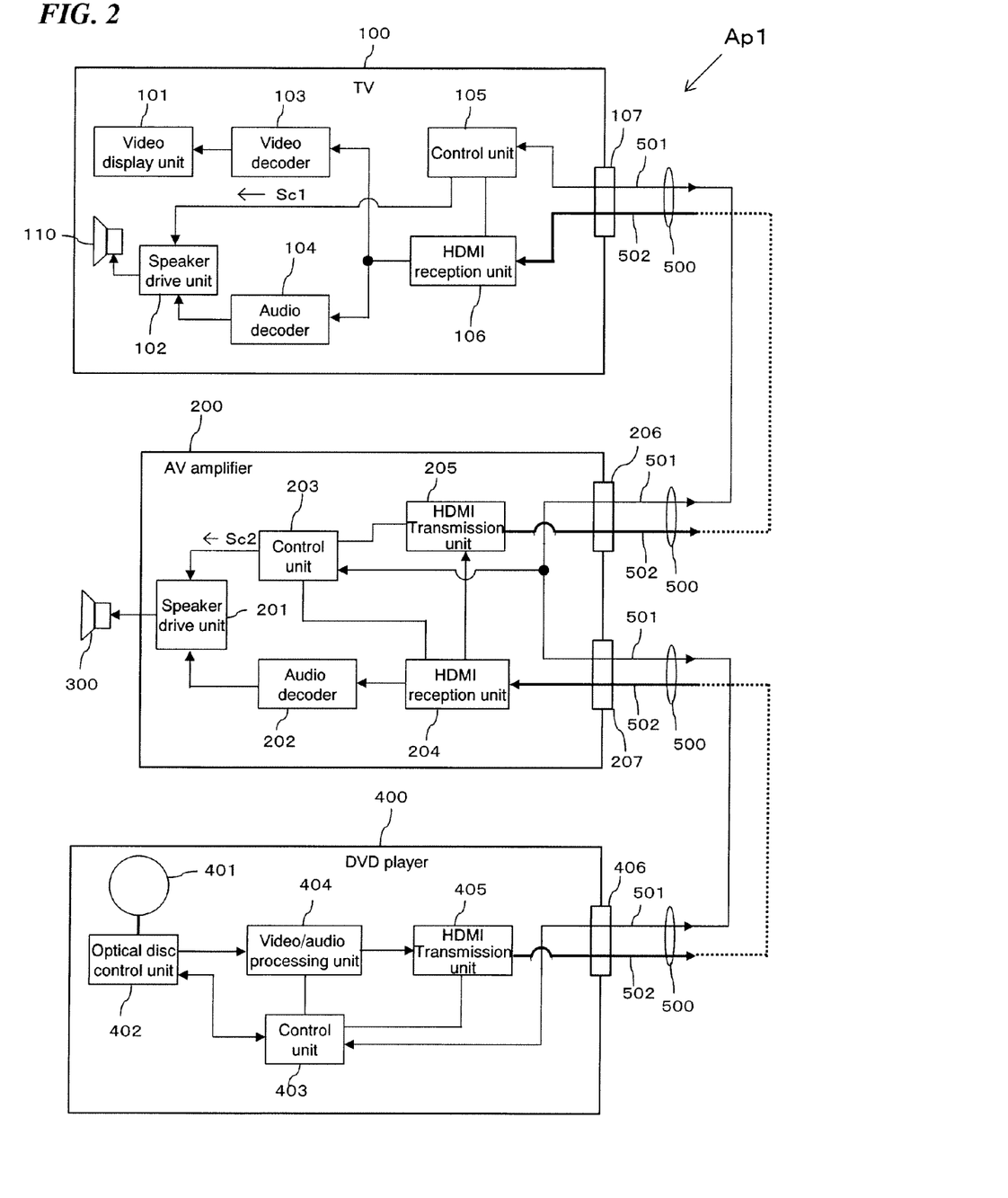
FIG. 2 is a block diagram that shows the internal configuration of a television, an AV amplifier, and a DVD player in FIG. 1.

FIG. 2 shows the internal configuration of each of the TV 100, the AV amplifier 200, and the DVD player 400 that configure the audio reproduction system according to this embodiment. The HDMI cable 500 is shown in FIG. 1 as one line, but in actuality, the HDMI cable 500 is configured with a CEC line 501 that sends CEC signals and video/audio lines that send video signals and audio signals. The CEC line 501 sends and receives CEC signals between each of control units 105, 203, and 403 of the TV 100, the AV amplifier 200, and the DVD player 400. Also, from the viewpoint of copyright protection, so that unscrambled video signals or audio signals are not present on the HDMI cable, sending and receiving of video signals and audio signals is performed between an HDMI reception unit and an HDMI transmission unit disposed within each device.

The TV 100 includes a video display unit 101, a speaker drive unit 102, a video decoder 103, an audio decoder 104, the control unit 105 configured with a microcomputer, an HDMI reception unit 106, an HDMI connector 107, and a built-in speaker 110. Additional constituent elements include a tuner that receives broadcast signals and a remote control reception unit, but these are not directly related to the invention and are therefore omitted.

The control unit 105 controls each part within the TV 100 according to commands received via an unshown remote control or the like. As described above, the TV 100 receives a request signal (CEC signal) related to the audio output mode from the DVD player 400. The control unit 105 receives this request signal, and sends an instruction signal (CEC signal) related to the audio output from the external speaker 300 to a control unit 203 of the AV amplifier 200, described later.

The HDMI reception unit 106 uses an encryption key to descramble video signals and audio signals input from the HDMI connector 107. Descrambled video signals are forwarded to the video decoder 103. Descrambled audio signals are forwarded to the audio decoder 104. The video decoder 103 decodes the video signals and outputs the decoded video signals to the video display unit 101. The audio decoder 104 decodes the audio signals and outputs the decoded audio signals to the speaker drive unit 102. Audio signals whose volume has been adjusted by the speaker drive unit 102 are output as audio from the built-in speaker 110.

The AV amplifier 200 includes a speaker drive unit 201, an audio decoder 202, the control unit 203 configured with a microcomputer, an HDMI reception unit 204, an HDMI transmission unit 205, and HDMI connectors 206 and 207.

The control unit 203 controls each part of the AV amplifier 200 according to CEC signals received via the HDMI connectors 206 and 207. As described above, the AV amplifier 200 receives an instruction signal (CEC signal) related to audio output from the external speaker 300 from the TV 100. The control unit 203 of the AV amplifier 200 receives this instruction signal, and controls the audio output from the external speaker 300.

The HDMI reception unit 204 uses an encryption key to descramble video signals and audio signals that have been sent from another device via a video/audio line 502 of an HDMI cable 500. On the other hand, the HDMI transmission unit 205 uses an encryption key to rescramble the video signals and audio signals that have been descrambled by the HDMI reception unit 204, and then feeds the rescrambled video signals and audio signals to the audio/video line 502 of the HDMI cable 500.

Audio signals received by the HDMI reception unit 204 are forwarded to the audio decoder 202. The audio decoder 202 decodes the audio signals and outputs the decoded audio signals to the speaker drive unit 201. Audio signals whose volume has been adjusted by the speaker drive unit 201 are output as audio from the external speaker 300.

The DVD player 400 includes an optical disk control unit 402, the control unit 403 configured with a microcomputer, a video/audio processing unit 404, and an HDMI connector 406. The optical disk control unit 402 reads video signals and audio signals from an optical disk 401, on which video signals and audio signals have been recorded in a compressed state. The control unit 403 controls each part of the DVD player 400 according to CEC signals received via the HDMI connector 405. As described above, the DVD player 400 sends a request signal with respect to the audio output mode to the TV 100. The control unit 403 of the DVD player 400 sends a request signal (CEC signal) related to the audio output mode to the control unit 105 of the TV 100.

The video/audio processing unit 404 performs necessary processing, including digitizing video signals and audio signals that have been read from an optical disk. Video signals and audio signals output from the video/audio processing unit 404 are input to the HDMI transmission unit 405. The HDMI transmission unit 405 scrambles video signals and audio signals using the encryption key, and feeds the scrambled video signals and audio signals to the video/audio line 502 of the HDMI cable 500.

Power is constantly supplied to the control units 105, 203, and 403 of each device. Accordingly, in a so-called standby state, such as in a state in which audio is not output from the speakers 102 and 300, and a state in which video signals and audio signals are not reproduced from the optical disk 401, CEC signals can be received. When audio is output from the speakers 110 and 300, or when video signals and audio signals are reproduced from the optical disk 401, necessary power is supplied to the speaker drive units 102 and 201, the video/audio processing unit 404, and the like. In the description below, a state in which power necessary to output audio from a speaker has been supplied to the speaker drive unit or the like is referred to as power supply on state, and a standby state is referred to as a power supply off state.

In the configuration in FIG. 2, the audio decoders 104 and 202 and the video/audio processing unit 404 are examples of the audio processing unit of the invention. The HDMI transmission units 205 and 405 are examples of the transmission unit of the invention, and the HDMI reception units 106 and 204 are examples of the receiving unit of the invention. The speaker drive units 102 and 201 are examples of the speaker drive unit of the invention.

Figure 3:
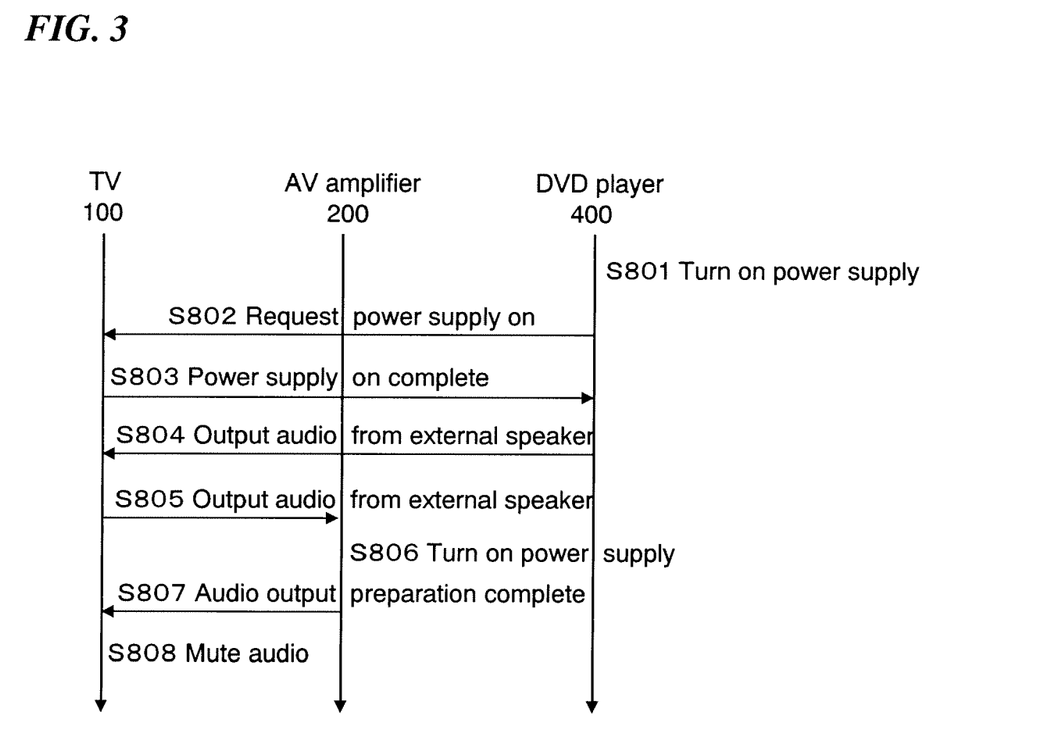
FIG. 3 illustrates a control sequence of the audio output system in FIG. 1.

Next is a description of the operation of the audio output system according to this embodiment. FIG. 3 shows a control sequence between devices in the audio output system according to the system in FIG. 1.

In Step S801, a user turns on power to the DVD player 400. Then, in Step S802, the control unit 403 of the DVD player 400 sends a power supply on request CEC signal to the TV 100 via the CEC line 501. In Step S803, the power supply of the TV 100 is turned on based on the CEC signal received by the control unit 105. Afterward, the control unit 105 returns a power supply on complete CEC signal to the DVD player 400.

The control unit 403 of the DVD player 400 sets the DVD player 400 to theater mode, which is an initial setting, i.e., a mode is set in which audio is output from the external speaker 300 connected to the AV amplifier 200. In Step S804, the control unit 403 sends a CEC signal to the TV 100 that requests audio output from the external speaker 300.

In Step S805, when the control unit 105 of the TV 100 receives this request signal, the control unit 105 sends a CEC signal to the control unit 203 of the AV amplifier 200 that instructs to output audio from the external speaker 300. In Step S806, the control unit 203 of the AV amplifier 200 turns on the power supply by the same method as in the TV 100. Afterward, in Step S807, the control unit 203 replies to the control unit 105 of the TV 100 with a CEC signal that informs that preparation to output audio from the external speaker 300 is completed.

In Step S808, when there is a reply that notifies that preparation for audio output is completed, in the TV 100, the control unit 105 sends a mute control signal Sa1 to the speaker drive unit 102, thus muting audio output of the built-in speaker 110. Note that the control unit 105 does not perform its mute control if there is not a reply that preparation for audio output from the external speaker is completed, as indicated in Step S807.

As described above, in the control method of this embodiment, it is possible to advance the control sequence by the DVD player 400 only sending a request signal with respect to the audio output mode to the TV 100, and the TV 100 only sending an instruction signal to the AV amplifier 200 that instructs to output audio from the external speaker 300. Thus, the control program of each control unit is simple. In particular, the DVD player 400 does not directly instruct the AV amplifier 200 in the present sequence. Accordingly, it is possible to avoid occurrence of a circumstance in which an instruction signal that instructs audio output is sent from the DVD player 400 to the TV 100 and the AV amplifier 200, so that audio is output from both the TV built-in speaker 110 and the external speaker 300. Also, a problem does not occur in which conversely, audio is not output from either the TV 100 or the external speaker 300.

Note that there may also be a case in which the AV amplifier 200 is not included in the audio output system, and the TV 100 and the DVD player 400 are directly connected with an HDMI cable 500. The control sequence in this case will be described below. The control unit 105 of the TV 100 receives a request signal from the control unit 403 of the DVD player 400, and sends a CEC signal to the control unit 203 of the AV amplifier 200 that instructs to output audio from the external speaker 300. However, a CEC signal that informs that preparation to output audio from the external speaker 300 is completed is not sent from the AV amplifier 200. In this case, the control unit 105 of the TV 100 judges that the external amplifier 200 is not connected, and stops sending the mute control signal Sc1 to the speaker drive unit 102. Accordingly, audio is output from the built-in speaker 110.

Second Embodiment

Figure 4:
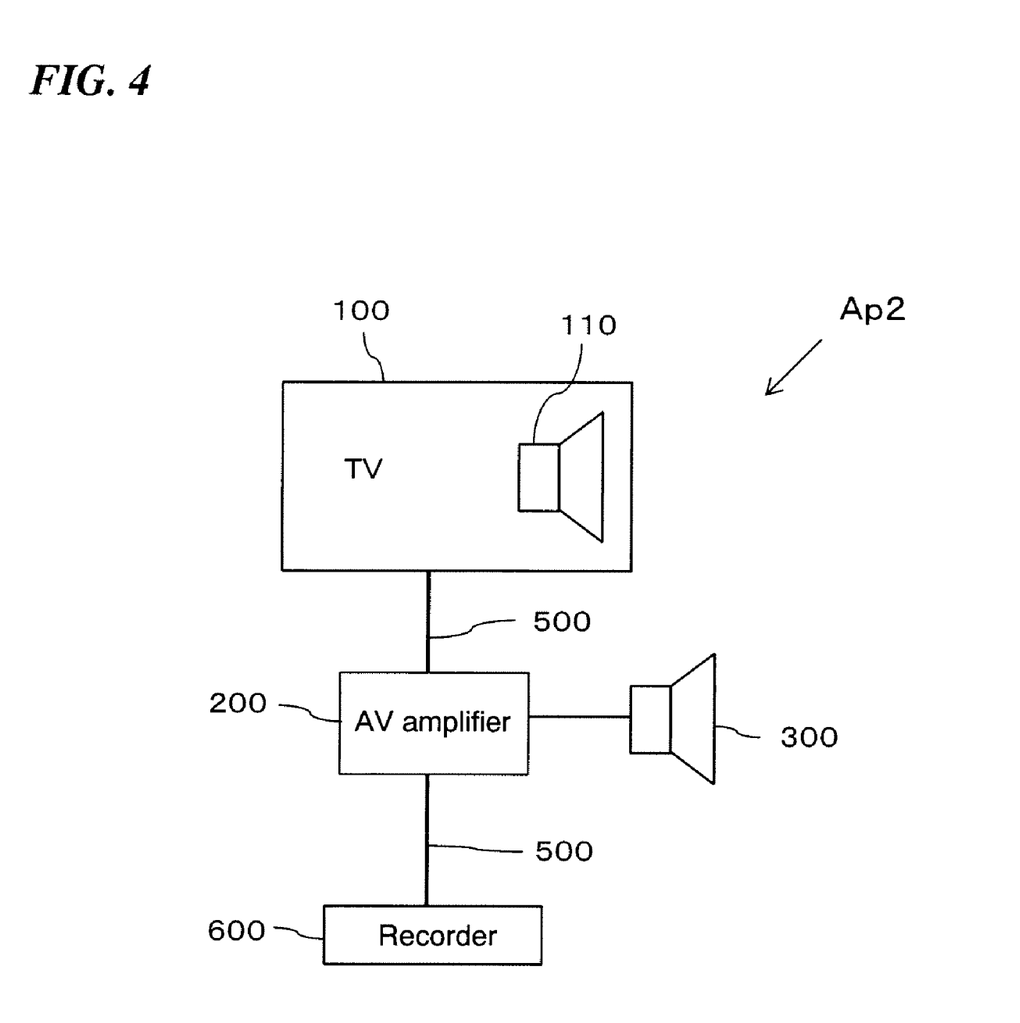
FIG. 4 is a block diagram that shows the configuration of an audio output system according to a second embodiment of the invention.

An audio output system Ap2 according to a second embodiment of the invention is shown in FIG. 4. In this embodiment, a recorder 600 is connected instead of the DVD player 400 that is a constituent element of the system of the first embodiment illustrated in FIGS. 1 and 2.

The recorder 600 differs from the DVD player 400 in that the recorder 600 is capable of recording video signals and audio signals to a recording media such an optical disk, but the point of recording video signals and audio signals to a recording media is not directly related to the invention. In the description below, a control unit 603 (not shown) of the recorder 600 is substituted for the control unit 403 of the DVD player 400.

Figure 5:
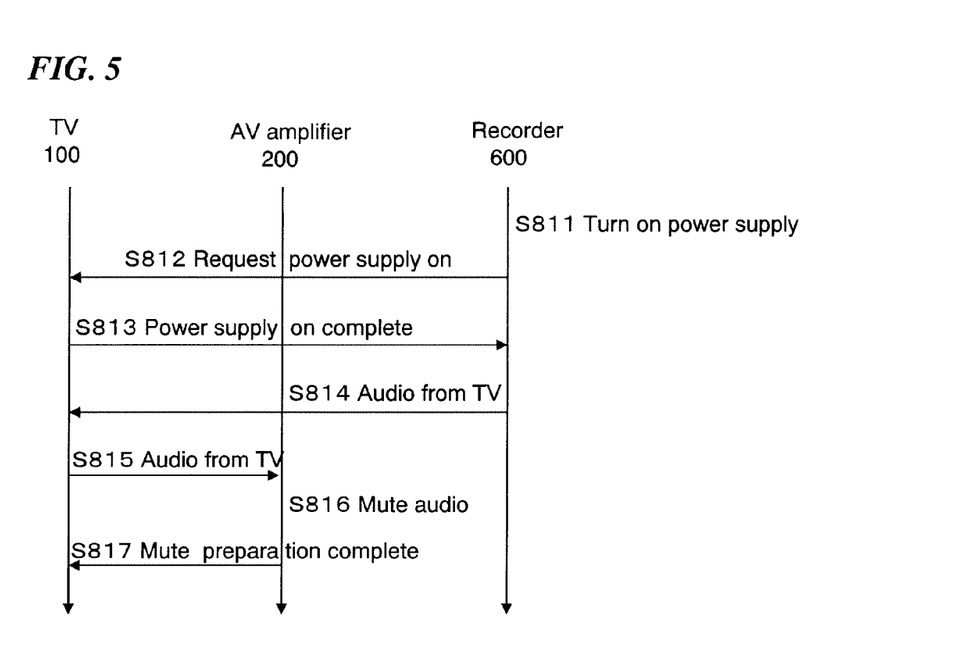
FIG. 5 illustrates a control sequence of the audio output system in FIG. 4.

FIG. 5 shows a control sequence between devices in the system configuration in FIG. 4. Below, operations are described using FIGS. 2, 4, and 5.

First, in Step S811, a user turns on power to the recorder 600. Then, in Step S812, the control unit 603 of the recorder 600 sends a power supply on request CEC signal to the control unit 105 of the TV 100 via the CEC line 501. The power supply of the TV 100 is turned on based on the CEC signal received by the control unit 105. Afterward, in Step S813, the control unit 105 returns a power supply on complete CEC signal to the control unit 603 of the recorder 600.

The recorder 600 is set to television mode, which is an initial setting, i.e., set to a mode in which audio is output from the built-in speaker 110 of the TV 100. Accordingly, in Step S814, the control unit 603 sends a CEC signal to the control unit 105 of the TV 100 that requests audio output from the built-in speaker 110 of the TV 100.

In Step S815, when the control unit 105 of the TV 100 receives this request signal, the control unit 105 sends a CEC signal to the control unit 203 of the AV amplifier 200 that instructs to output audio from the TV built-in speaker 110, and to not output audio from the external speaker 300. In Step S816, according to this instruction, the control unit 203 of the AV amplifier 200 maintains an off state if the power supply has been turned off, and if the power supply has been turned on, sends a mute control signal Sc2 to the speaker drive unit 201 to mute audio of the external speaker 300. In Step S817, the control unit 203 replies to the control unit 105 of the TV 100 with a CEC signal that informs that preparation to not output audio from the external speaker 300 is completed.

In this embodiment, when adopting the control sequence described above, same as in the above first embodiment, setting of the audio output mode can simply be performed, and the control program of each control unit is also simple.

Third Embodiment

In the third embodiment of the invention, a remote control (not shown) accompanying the AV amplifier 200 is provided with a dedicated key for performing reproduction of video signals and audio signals from the DVD player 400. Below, this dedicated key is referred to as a one touch reproduction key. When the one touch reproduction key is pressed, the DVD player 400 automatically starts reproduction. Note that the configuration of the audio output system is the same as in FIGS. 1 and 2, except that the dedicated key is provided in the remote control accompanying the AV amplifier 200.

Figure 6:
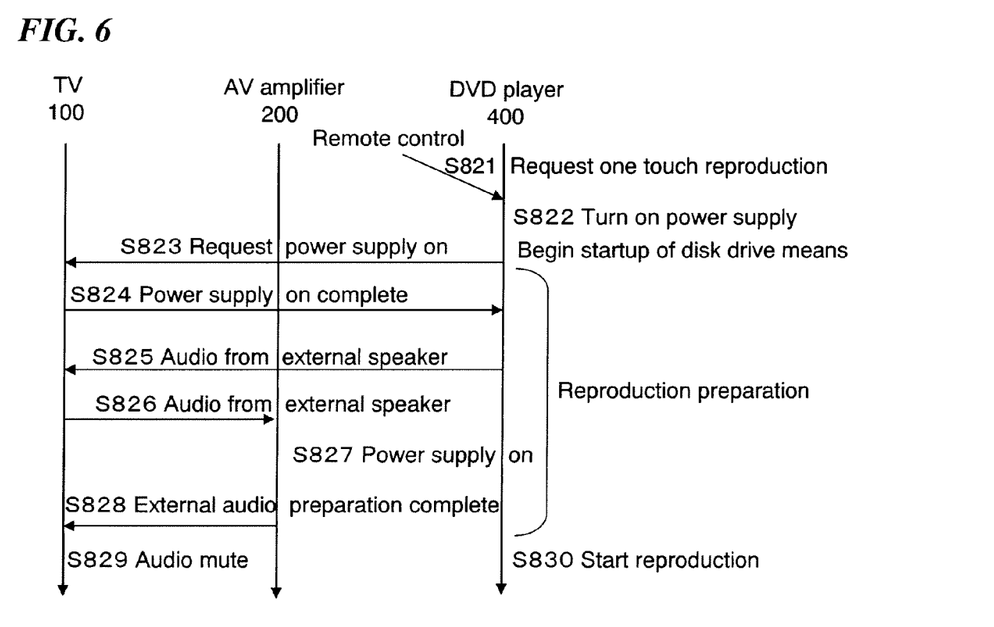
FIG. 6 illustrates a control sequence of an audio output system according to a third embodiment of the invention.

FIG. 6 shows, in the configuration of the system of this embodiment, the control sequence when the one touch reproduction button is pressed. Below, operations are described using FIGS. 1, 2, and 6.

In Step S821, when the user presses the one touch reproduction key on the accompanying remote control, a special remote control code is emitted from the remote control. A one touch reproduction request signal is received not by the AV amplifier 200, but by the control unit 403 of the DVD player 400. This is so that regardless of operation of the keys provided on the remote control of the AV amplifier 200, receiving of this remote control code by the DVD player 400 matches the control sequence of the above-described first embodiment. In this embodiment, same as in the first embodiment, operation starts with turning on the power supply of the DVD player 400.

In Step S822, the control unit 403 of the DVD player 400 turns on the power supply of the DVD player 400 when a one touch reproduction request signal is received. At the same time as the power supply is turned on, a disk drive means built into the optical disk control unit 402 begins startup. After startup of the disk drive means, "reproduction preparation", namely adjustment of a servo system, reading of management information such as a table of contents and lead-in information, and the like, is performed. The control below is performed during this "reproduction preparation".

In Step 823, the control unit 403 of the DVD player 400 sends a CEC signal to the control unit 105 of the TV 100 that requests turning on the power supply. In Step S824, after turning on the power supply, the control unit 105 of the TV 100 returns a power supply on complete CEC signal to the control unit 403 of the DVD player 400.

Next, in Step S825, the control unit 403 of the DVD player 400 sends a CEC signal that requests setting of the audio output mode to the theater mode, i.e., a signal that requests audio output from the external speaker 300, to the control unit 105 of the TV 100.

In Step S826, according to this request signal, the control unit 105 of the TV 100 sends a CEC signal to the control unit 203 of the AV amplifier 200 that instructs to output audio from the external speaker 300. In Step S827, when the control unit 203 of the AV amplifier 200 receives this CEC signal, the control unit 203 turns on the power supply. Subsequently, in Step S828, the control unit 203 sends a reply to the control unit 105 of the TV 100 that preparation to output audio from the external speaker 300 is completed.

In Step S829, if there is a reply that preparation for audio output from the external speaker is completed, the control unit 105 of the TV 100 sends a mute control signal Sc1 to the speaker drive unit 102, thus muting the audio of the built-in speaker 110. On the other hand, if there is not a reply that preparation for audio output from the external speaker is completed, the control unit 105 does not send a mute control signal Sc1 to the speaker drive unit 102. The DVD player 400 completes the "reproduction preparation" while the above control sequence is being executed among the devices, and thus in Step S830 the DVD player 400 is in a state in which reproduction can be started.

In this embodiment, by adopting the control sequence described above, when the one touch reproduction key is pressed, it is possible to complete reproduction preparation of the DVD player along with setting the audio output mode.

Fourth Embodiment

In the third embodiment, the DVD player 400 received the one touch reproduction request signal, but in this embodiment, a case is described in which the recorder 600 is connected to the system, and the recorder 600 receives the one touch reproduction signal. Also, same as in the second embodiment, in the description below, the control unit 603 of the recorder 600 is substituted for the control unit 403 of the DVD player 400.

Figure 7:
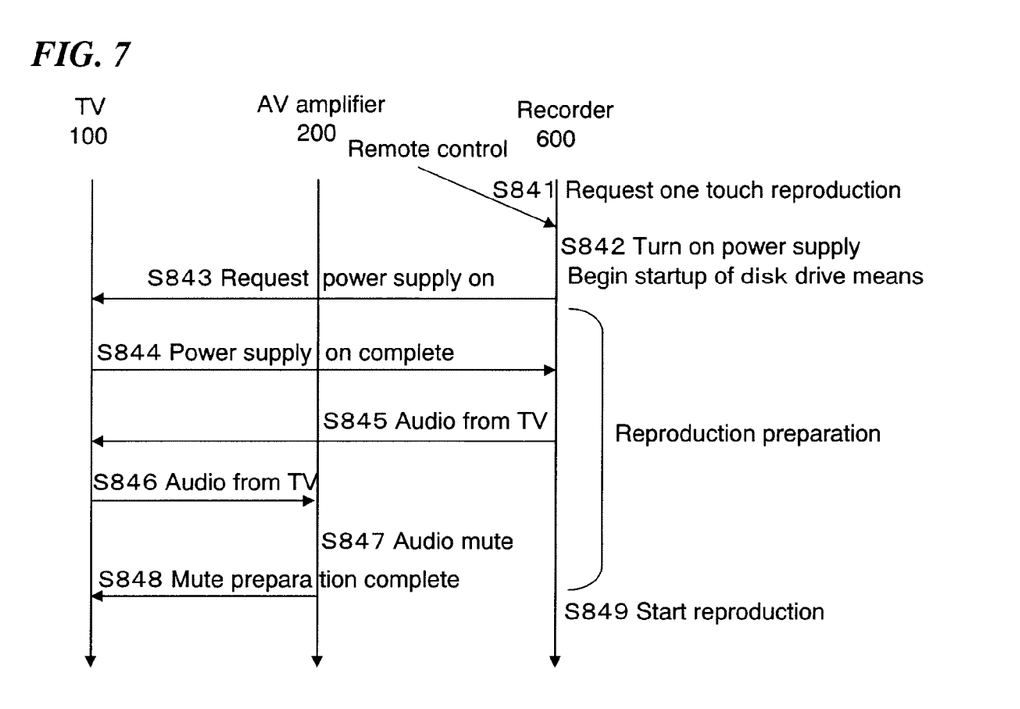
FIG. 7 illustrates a control sequence of an audio output system according to a fourth embodiment of the invention.

FIG. 7 shows, in the configuration of the system of this embodiment, the control sequence when the one touch reproduction button is pressed. Below, operations are described using FIGS. 1, 2 and 7.

When the control unit 603 of the recorder 600 receives a one touch reproduction request signal in Step S841, in Step S842 the control unit 603 turns on the power supply of the recorder 600. When the power supply is turned on, a disk drive means built into the recorder 600 begins startup. After startup of the disk drive means, "reproduction preparation", namely adjustment of a servo system, reading of management information such as a table of contents, and the like, is performed. The control below is performed during this "reproduction preparation".

In Step S843, the control unit 603 of the recorder 600 sends a CEC signal to the control unit 105 of the TV 100 that requests turning on the power supply. In Step S844, after turning on the power supply of the TV 100, the control unit 105 of the TV 100 replies with a power supply on complete CEC signal to the control unit 603 of the recorder 600.

Next, in Step S845, the control unit 603 of the recorder 600 sends a CEC signal that requests setting of the audio output mode to the television mode, i.e., a signal that requests audio output from the built-in speaker 110 of the TV 100, to the control unit 105 of the TV 100.

In Step S846, according to this request signal, the control unit 105 of the TV 100 sends a CEC signal to the control unit 203 of the AV amplifier 200 that instructs to output audio from the TV built-in speaker 110, and to not output audio from the external speaker 300. In Step S847, according to this instruction signal, the control unit 203 of the AV amplifier 200 maintains an off state if the power supply has been turned off, and if the power supply has been turned on, sends a mute control signal Sc2 to the speaker drive unit 201 to mute audio of the external speaker 300. Afterward, in Step S848, the control unit 203 replies to the control unit 105 of the TV 100 with a CEC signal that informs that preparation to not output audio from the external speaker 300 is completed. The recorder 600 completes the "reproduction preparation" while the above control sequence is being executed among the devices, and thus in Step S849 the recorder 600 is in a state in which reproduction can be started.

In this embodiment, by adopting the control sequence described above, same as in the third embodiment, by pressing the one touch reproduction key, it is possible to complete reproduction preparation of the recorder along with setting the audio output mode.

As described above, with this invention, control of the audio output mode is performed according to a very simple sequence. More specifically, with the control method of the invention, it is possible to realize the sequence below with a simple program, without the respective devices being aware of their combination.

1. If a TV, an AV amplifier, and a DVD player are connected, when the power supply is turned on, the audio output mode is set to the theater mode and power is supplied.

2. If a TV, an AV amplifier, and a recorder are connected, when the power supply is turned on, the audio output mode is set to the television mode and power is supplied.

3. If a TV and a recorder or a DVD player are connected, when the power supply is turned on, the audio output mode is set to the television mode and power is supplied.

Also, in each of the above embodiments, a case was described in which a DVD player or a recorder was connected to the audio output system, but the invention is not limited to such a case. With the invention, the same effects are of course also obtained in a case in which a set top box or other video/audio reproduction device has been connected to the system.

INDUSTRIAL APPLICABILITY

With the audio output system control method of the invention, it is possible to set the audio output mode according to a simple control sequence, so the audio output system control method of the invention is widely applicable to audio output systems in which various devices have been connected.

The invention claimed is:

1. A method for controlling an audio output system comprising an audiovisual device that outputs video and audio, an external audio device that outputs audio from an external speaker and that is connected to the audiovisual device, and an audio reproduction device that reproduces audio signals, the method comprising the steps of:
   (a) the audio reproduction device sending a request signal related to an audio output mode to the audiovisual device, and
   (b) the audiovisual device selecting, according to the received request signal, either a state in which audio is output from the external speaker connected to the external audio device, or a state in which audio is not output from the external speaker, the audiovisual device setting a state of a built-in speaker of the audiovisual device to be opposite to the selected state of the external speaker, and the audiovisual device sending to the external audio device a first instruction signal that instructs to establish the selected state.

2. The method for controlling an audio output system according to claim 1, wherein the audio reproduction device, subsequent to processing to turn on a power supply, sends the request signal to the audiovisual device.

3. The method for controlling an audio output system according to claim 1, wherein when the audio reproduction device is provided with a function to reproduce audio signals from recording media, the request signal is a signal that requests audio to be output from the external speaker connected to the external audio device.

4. The method for controlling an audio output system according to claim 1, wherein when the audio reproduction device is provided with a function to reproduce audio signals from recording media, and record audio signals to the recording media, the request signal is a signal that requests audio to be output from the built-in speaker of the audiovisual device.

5. The method for controlling an audio output system according to claim 1, wherein after the audiovisual device sends the first instruction signal to the external audio device, if a response signal to the first instruction signal is not returned from the external audio device, the audiovisual device outputs audio from the built-in speaker of the audiovisual device.

6. The method for controlling an audio output system according to claim 1, wherein the audio reproduction device, before sending the request signal to the audiovisual device, sends a second instruction signal to the audiovisual device that turns on a power supply of the audiovisual device.

7. The method for controlling an audio output system according to claim 1, wherein the audiovisual device, before sending the first instruction signal to the external audio device, sends a third instruction signal to the external audio device that turns on a power supply of the external audio device.

8. An audio output system comprising an audiovisual device that outputs video and audio, an external audio device that outputs audio from an external speaker and that is connected to the audiovisual device, an audio reproduction device that reproduces audio signals, and a communication line that connects each of the devices,
   (a) the audiovisual device comprising:
      a built-in speaker that outputs audio,
      a first reception unit that receives audio signals from outside via the communication line,
      a first audio processing unit that performs necessary processing on the audio signals received by the first reception unit,
      a first speaker drive unit that drives the built-in speaker using output of the first audio processing unit as input, and
      a first control unit that controls at least the first reception unit and the first speaker drive unit,
   (b) the external audio device comprising:
      a second reception unit that receives audio signals from outside via the communication line,
      a second audio processing unit that performs necessary processing on the audio signals received by the second reception unit,
      a second speaker drive unit that drives the external speaker using output of the second audio processing unit as input,
      a second transmission unit that transmits the audio signals received by the second reception unit to outside via the communication line, and
      a second control unit that controls at least the second reception unit, the second transmission unit, and the second speaker drive unit, and
   (c) the audio reproduction device comprising:
      a third audio processing unit that performs necessary processing on audio signals that have been reproduced,
      a transmission unit that transmits audio signals that have been output from the third audio processing unit to outside via the communication line, and
      a third control unit that controls at least the third audio processing unit and the transmission unit,
   (d) wherein the third control unit sends a request signal related to an audio output mode to the first control unit, and
      the first control unit sends to the second control unit, according to the received request signal, an instruction signal that instructs to establish either a state in which audio is output from the external speaker, or to establish a state in which audio is not output from the external speaker, and the first control unit performs control so as to set a state of the built-in speaker of the audiovisual device to be opposite to the established state of the external speaker.

9. The audio output system according to claim 8, wherein the third control unit, subsequent to processing to turn on a power supply of the audio reproduction device, sends the request signal to the first control unit.

10. The audio output system according to claim 8, wherein when the audio reproduction device is a device provided with a function to reproduce audio signals from recording media, the third control unit sends to the first control unit, as the request signal, a signal that requests audio to be output from the external speaker connected to the external audio device.

11. The audio output system according to claim 8, wherein when the audio reproduction device is a device provided with a function to reproduce audio signals from recording media, and record audio signals to the recording media, the third control unit sends to the first control unit, as the request signal, a signal that requests audio to be output from the built-in speaker of the audiovisual device.

12. An audiovisual device that outputs video and audio, and along with an external audio device that outputs audio from an external speaker and that is connected to the audiovisual device and an audio reproduction device that reproduces audio signals, comprises an audio output system,
   (a) the audiovisual device comprising:
      a built-in speaker that outputs audio,
      a reception unit that receives audio signals from outside via a communication line,
      an audio processing unit that performs necessary processing on the audio signals received by the reception unit,
      a speaker drive unit that drives the built-in speaker using output of the audio processing unit as input, and
      a first control unit that controls at least the reception unit and the speaker drive unit,
   (b) wherein the first control unit sends, to a second control unit of the external audio device, an instruction signal that instructs to establish either a state in which audio is output from the external speaker, or to establish a state in which audio is not output from the external speaker, and the first control unit also controls the speaker drive unit so as to set a state of the built-in speaker to be opposite to the established state of the external speaker.

13. An external audio device that outputs audio from an external speaker, and along with an audiovisual device that outputs video and audio and that is connected to the external audio device, and an audio reproduction device that reproduces audio signals, comprises an audio output system,
   (a) the external audio device comprising:
      a reception unit that receives audio signals from outside via a communication line,
      an audio processing unit that performs necessary processing on the audio signals received by the reception unit,
      a speaker drive unit that drives the external speaker using output of the audio processing unit as input,
      a transmission unit that transmits the audio signals received by the reception unit to outside via the communication line, and
      a first control unit that controls at least the reception unit, the transmission unit, and the speaker drive unit,
   (b) wherein the first control unit receives an instruction signal, sent from a second control unit of the audiovisual device, that instructs to establish either a state in which audio is output from the external speaker, or to establish a state in which audio is not output from the external speaker, and according to the received instruction signal, the first control unit controls the speaker drive unit.

14. An audio reproduction device that reproduces audio signals, and along with an audiovisual device that outputs video and audio, and an external audio device that outputs audio from an external speaker and that is connected to the audiovisual device, comprises an audio output system, (a) the audio reproduction device comprising:
an audio processing unit that performs necessary processing on reproduced audio signals,
a transmission unit that transmits audio signals output from the audio processing unit to outside via a communication line, and
a first control unit that controls at least the audio processing unit and the transmission unit,
(b) wherein the first control unit, when the audio reproduction device is a device provided with a function to reproduce audio signals from recording media, sends, from the transmission unit to a second control unit of the audiovisual device, a signal that requests audio to be output from the external speaker connected to the external audio device.

15. The audio reproduction device according to claim 14, wherein the control unit, subsequent to processing to turn on a power supply, sends the request signal to the second control unit of the audiovisual device.

16. An audio reproduction device that reproduces audio signals, and along with an audiovisual device that outputs video and audio, and an external audio device that outputs audio from an external speaker and that is connected to the audiovisual device, comprises an audio output system,
(a) the audio reproduction device comprising:
an audio processing unit that performs necessary processing on reproduced audio signals,
a transmission unit that transmits audio signals output from the audio processing unit to outside via a communication line, and
a first control unit that controls at least the audio processing unit and the transmission unit,
(b) wherein the first control unit, when the audio reproduction device is a device provided with a function to reproduce audio signals from recording media, and record audio signals to the recording media, sends, from the transmission unit to a second control unit of the audiovisual device, a signal that requests audio to be output from a built-in speaker of the audiovisual device.

* * * * *